Sept. 1, 1953          F. BERMAN          2,650,836

WRITING PAD UNIT FOR AUTOMOBILE STEERING WHEELS

Filed June 30, 1950          2 Sheets—Sheet 1

INVENTOR.
FRANK BERMAN
BY
ATTORNEY.

Sept. 1, 1953  F. BERMAN  2,650,836
WRITING PAD UNIT FOR AUTOMOBILE STEERING WHEELS
Filed June 30, 1950  2 Sheets-Sheet 2
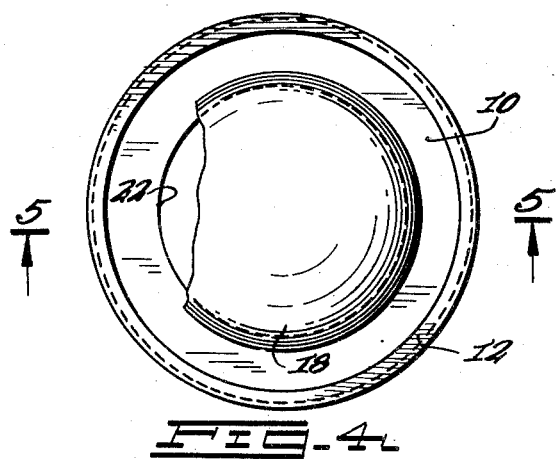
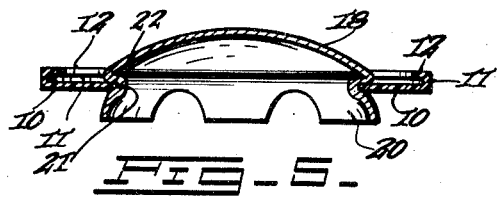
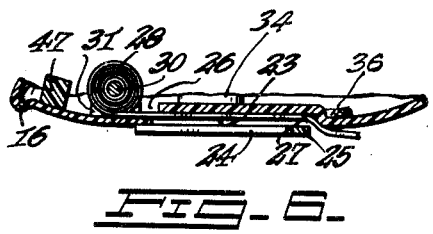 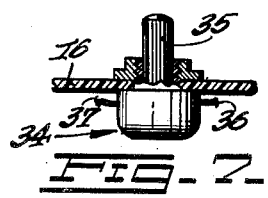
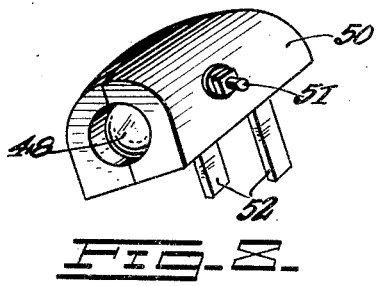
INVENTOR.
FRANK BERMAN
BY
ATTORNEY.

Patented Sept. 1, 1953

2,650,836

UNITED STATES PATENT OFFICE 2,650,836

WRITING PAD UNIT FOR AUTOMOBILE STEERING WHEELS

Frank Berman, Pewaukee, Wis.

Application June 30, 1950, Serial No. 171,355

6 Claims. (Cl. 281—12)

This invention relates to a writing pad unit for automobile steering wheels.

A difficulty often encountered by the driver of an automobile is the memorizing of verbally given directions which often are complicated and lengthy.

One object of the invention therefore is the provision of a writing pad unit mountable on the horn or other button located at the center of an automobile steering wheel, said unit including writing means and a surface to write on.

Thus the user of the automobile can readily write down verbal directions with the result that such directions are not subject to being forgotten.

Another object of the invention is to construct the said unit so that even though the same is mounted over the horn button the latter can be depressed in the normal manner.

Still another object of the invention is the provision of means for illuminating the unit so that the same can be utilized at night.

A still further object of the invention is to construct and arrange the unit so that the same is capable of being manufactured economically and of being assembled on a steering wheel in an extremely facile manner.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 4 is a plan view of a portion of the unit.

Fig. 5 is a sectional view on line 5—5 of Fig. 4.

Fig. 6 is a fragmentary sectional view on line 6—6 of Fig. 3.

Fig. 7 is a fragmentary sectional view on line 7—7 of Fig. 1.

Fig. 8 is a detail perspective view of the illuminating means.

Figure 1:
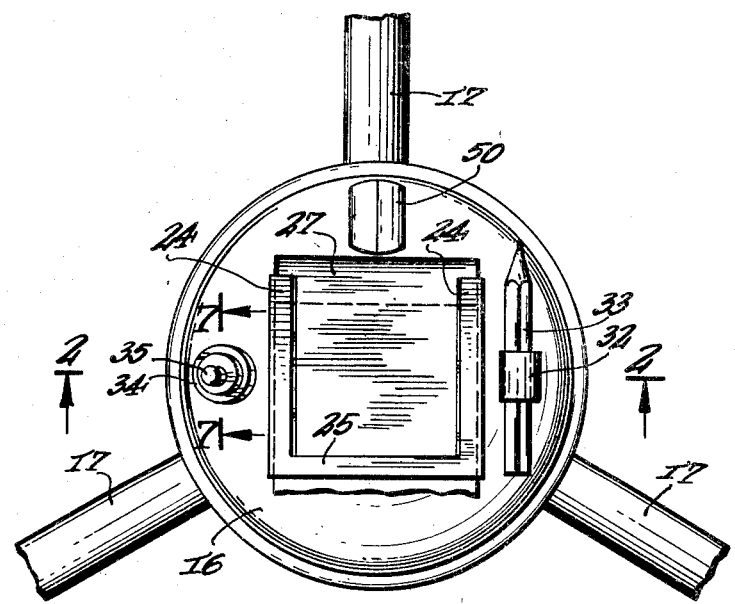
Fig. 1 is a plan view of the unit in place on an automobile steering wheel, with portions of the said wheel being broken away.

The writing pad unit for automobile steering wheels, according to the present invention, includes a base 10 in the form of a disc having an upwardly extending wall 11 which at its upper end is turned inwardly at 12. Preferably the base 10 is formed of a flexible plastic such that the turned in rim 12 can be snapped over a flange 13 formed on a wall 14 of an inverted bowl-like member 15 having also a substantially flat upper surface 16. Member 16 also is formed of a flexible plastic, and when the flange 13 is snapped beneath the rim 12, said member and the base 10 are securely fixed together. If desired other fastening means such as screws or the like could be provided.

Figure 2:
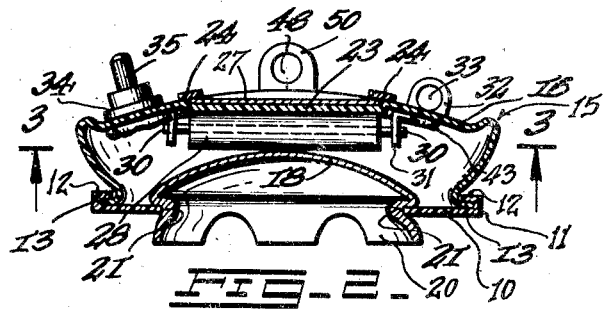
Fig. 2 is a sectional view on line 2—2 of Fig. 1, with the steering wheel removed.

The great majority of steering wheels are provided with a plurality of spokes 17 such as in Fig. 1, said spokes being secured at their inner ends in familiar fashion to a housing (not shown) which is capped by a button 18, see Figs. 2 and 5. The said button is provided with a downwardly extending wall 20, which, below a groove-like portion 21 thereof, flares outwardly; and it is the tension of this flared out portion that secures the button on the said housing.

According to the invention the base 10 is provided with a cutout 22 to embrace the groove-like portion 20 of the wall of the convexly formed button 18, the flared portion of the wall being snapped through the cutout. As shown, the upper part of button 18 overlaps the cutout 22 in base 10 so that when the button is secured in place atop the steering wheel housing the base is secured in place between the housing and the overlapping portion of the button. When, then, the member 15 is affixed to base 10 the button 18 is enclosed in the space between said base 10 and the upper surface 16 of the said member 15. The proportions of the parts are such that the apex of the convexly formed button 18 is located but a short distance below the said upper surface 16. The utility of this construction will be pointed out presently.

In some instances the button 18 is not fixedly mounted in the said housing by the flare of the button wall 20, but rather is maintained on the housing against the tension of a strong spring tending to push it off the housing. This construction is provided so that the button can be depressed by the hand to close electrical contacts which control the sounding of a horn.

In such instances, the close spacing of the apex of the button 18 from the upper surface 16 of member 15 permits the said surface being depressed by hand to contact the button and depress the latter to sound the horn. This is one of the reasons for constructing the member 15 of flexible material.

Thus, if the button 18 is utilized for sounding a horn the unit of the invention, even though mounted thereon, does not interfere with the operation thereof.

Referring to Figs. 1, 2, 3, 6 and 7, the surface 15 is provided at its center with an offset or groove 23, the sides of which are overlapped each by a strip 24 and one end of which is covered by a strip 25. The strips 24 are secured throughout their length to the surface 15, but the strip 25 is secured to the said surface only at its ends, the remainder thereof overlying the groove 23. As best shown in Fig. 6, the end of groove 23 opposite the strip 25 is slit through as at 26 to permit passage into the groove of a paper tape 27 which extends the length of the groove and out thereof beneath the strip 25.

Figure 3:
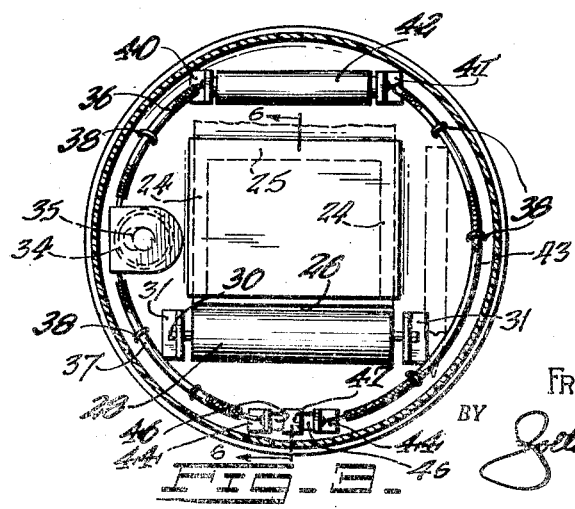
Fig. 3 is a sectional view on line 3—3 of Fig. 2.

A supply of the tape 27 is wound into a roll 28 on a rod 30 which at its ends is journalled in brackets 31 secured to the under side of the surface 15, see also Fig. 3. It will be seen therefore that a substantial supply of tape may be provided, which supply is easily fed through the groove 23.

It is contemplated by the invention that directions or the like be written on that portion of the tape held in the groove 23 by the strips 24 and 25. To this end a loop 32 is secured to the surface 15 to one side of said groove, the loop being so dimensioned as to secure against the said surface a pencil 33, see Fig. 1. If desired the loop may be replaced by a suitable pencil retaining recess in the surface 15.

It is to be mentioned that the ordinary pressure of writing on the tape 27 with the pencil 33 is not sufficient to depress the surface 15 and sound the horn if the button 18 is used for such purpose.

In order that the portion of the tape 27 to be written on can be illuminated at night and at other times when illumination is needed, the following means are provided:

An electrical switch 34 projects through and is secured in a suitable hole in the surface 16 on the opposite side of the groove 23 from the pencil 33, see Figs. 1, 3 and 7. Said switch includes a finger piece 35 which can be turned to make or break contact between a pair of wires 36 and 37 electrically connected to the switch and secured to the under side of surface 16 by staples 38 or by any other means. The other end of wire 36 preferably is soldered to a metallic contact plate 40 suitably secured to the under side of surface 16. The plate 40 and a second plate 41 identical therewith support between them a dry cell battery 42 whose casing contacts one plate and whose center post contacts the other plate. A wire 43 is soldered to plate 41 at one end and at the other end to one of a pair of contact plates 44 secured to the under side of surface 16 adjacent the paper roll 28. The other of the contact plates 44 is connected by the wire 37 with the switch 34. The contact plates 44 are spaced a short distance apart and have located between them a pair of slots 46 in the surface 16 one slot on either side of an insulative block 47.

Referring also to Fig. 8, the source of illumination is a light bulb 48 suitably mounted in a plastic case 50 made in two parts secured together by bolt and nut 51, and having projecting from the under side thereof a pair of contact prongs 52. The prongs 52 are inserted through the slots 46 to make contact with the contact plates 44. Thus, if the switch 34 is closed the bulb 48 will illuminate the paper tape 27 located in the groove 23.

To replace the paper roll 28 or the battery 42 the member 15 is snapped free of the rim 12 of base 10.

It is to be mentioned that in those few instances in which the button 18 is not provided, the unit can be secured in place by brackets, clamps, straps or the like.

It will be seen, therefore, that there has been provided an extremely simple and effective writing pad unit for mounting on an automobile steering wheel.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:

1. In a writing table engageable over the horn button of the steering wheel of a vehicle, the steering wheel having a peripheral groove about its free end, the combination of a disc plate including a central cutout section whereby the disc plate is adapted to fit over the horn button and to be engageable in the said groove, a bowl like element having an annular wall removably engaged with the disc plate and including a resilient flat top surface serving as a writing table and arranged for close spaced relation to the horn button when the disc plate is engaged with the groove of the steering wheel.

2. In a writing table as set forth in claim 1, wherein the annular wall of the bowl element is of resilient material and the disc plate includes a marginal flange in which the annular wall of the bowl is removably snapped.

3. In a writing table as set forth in claim 1, wherein the bowl element includes on its undersurface a spool of writing paper and is provided with a slit adapted to enable passage of the paper from the spool to and over the top flat surface of the bowl, and the flat surface includes marginal means for retaining and guiding the paper in position thereover.

4. In a writing table as set forth in claim 1, wherein the bowl element is provided with means on its upper surface for illuminating the writing table and includes a source of power therefor secured to its undersurface.

5. A writing table of the character described, comprising a disc member removably engageable with the free end of the steering wheel of a vehicle, a plastic bowl element including a flat surface adapted for use as a writing table, an annular flange about the disc member, the bowl element having an annular resilient wall in snapped and removable engagement with the disc flange, a spool of writing paper removably engaged to the undersurface of the bowl element, the bowl element including a slit adapted to enable passage therethrough of the writing paper from the spool to the surface of the bowl, and guide means on the surface of the bowl arranged to position the writing paper over the flat bowl surface as it issues from the slit.

6. In a writing table of the character described, a disc plate adapted to be removably engaged over the horn button and free end of the steering wheel of a vehicle, a bowl element of resilient plastic material having an annular wall removably engaged with the disc plate and including a resilient flat surface in spaced relation to the disc member serving as a writing table and when depressed adapted to operate the horn button.

FRANK BERMAN.

References Cited in the file of this patent

UNITED STATES PATENTS

| Number | Name | Date |
|---|---|---|
| 511,031 | Stuart et al. | Dec. 19, 1893 |
| 1,279,820 | Brassard | Sept. 24, 1918 |
| 1,450,446 | Nelson | Apr. 3, 1923 |
| 1,745,255 | Griffiths | Jan. 28, 1930 |
| 1,791,325 | Ralph | Feb. 3, 1931 |
| 1,838,711 | Siple | Dec. 29, 1931 |
| 1,875,543 | Albritton | Sept. 6, 1932 |
| 2,054,459 | Burt | Sept. 15, 1936 |
| 2,142,103 | Barcroft | Jan. 3, 1939 |
| 2,258,685 | Mattlatzki | Oct. 14, 1941 |
| 2,501,079 | Nielsen | Mar. 21, 1950 |